United States Patent [19]
Inoue

[11] Patent Number: 5,860,005
[45] Date of Patent: Jan. 12, 1999

[54] APPARATUS FOR SUPPORTING DEVELOPMENT OF INFORMATION PROCESSING SYSTEM

[75] Inventor: Tomoki Inoue, Kawasaki, Japan

[73] Assignee: Fujitsu Ltd., Kawasaki, Japan

[21] Appl. No.: 756,339

[22] Filed: Nov. 26, 1996

[30] Foreign Application Priority Data

Jul. 16, 1996 [JP] Japan .................................. 8-185945

[51] Int. Cl.[6] .............................. G06F 17/30; G06F 13/00
[52] U.S. Cl. ............................................................ 395/701
[58] Field of Search ........................................... 395/701

[56] References Cited

U.S. PATENT DOCUMENTS

| | | | |
|---|---|---|---|
| 5,396,626 | 3/1995 | Nguyen ................................... | 395/701 |
| 5,603,034 | 2/1997 | Swanson ................................. | 395/701 |
| 5,642,511 | 6/1997 | Chow et al. ............................ | 395/701 |
| 5,710,926 | 1/1998 | Maurer ................................... | 395/701 |
| 5,758,153 | 5/1998 | Atsatt et al. ........................... | 395/701 |

*Primary Examiner*—James P. Trammell
*Assistant Examiner*—John Q. Chavis
*Attorney, Agent, or Firm*—Staas & Halsey

[57] ABSTRACT

An apparatus for supporting development of information processing systems where a plurality of computers are incorporated. A project data entry unit provides functions for entering various information descriptive of project specifications including information on a plurality of applications and data resources to be integrated into the target information processing system. An application property analyzing unit analyzes properties of each application, thus creating an application property table. Likewise, a data property analyzing unit analyzes properties of each data resource, thus creating a data property table. Consulting those two tables, a system pattern searching unit produces some search parameters. A system pattern database is prepared beforehand for storing a variety of system patterns associated with different search parameters. The system pattern searching unit searches this system pattern database for system patterns that correspond to the search parameters produced above, thus extracting a plurality of system patterns. A system pattern combination unit then combines the system patterns extracted by the system pattern searching unit to propose an optimum system configuration.

7 Claims, 15 Drawing Sheets

|  | TEMPORAL INVARIANCE | | |
|---|---|---|---|
|  | LONG TERM (ROUTINE) | MIDDLE TERM (DYNAMIC) | SHORT TERM (NON-ROUTINE) |
| LARGE SCALE (ENTERPRISE-WIDE) | | | |
| MEDIUM SCALE (INTRA-DEPARTMENT) | | | |
| SMALL SCALE (PERSONAL) | | | |
| SPATIAL DIVERSITY | | | |

FIG. 2

| DATA RESOURCES \ APPLICATIONS | DATA #1 | DATA #2 | DATA #3 | DATA #4 | DATA #5 | DATA #6 | DATA #7 | DATA #8 | DATA #9 | DATA #10 | DATA #11 | DATA #12 | DATA #13 | DATA #14 | DATA #15 | DATA #16 | DATA #17 | DATA #18 | DATA #19 |
|---|---|---|---|---|---|---|---|---|---|---|---|---|---|---|---|---|---|---|---|
| DEPARTMENT #1 APPLICATION #1 | ◎ | | | | | | | | | | | | | | | | | | |
| APPLICATION #2 | △ | ◎ | | △ | | | | | | | | | | | | | | | |
| APPLICATION #3 | | | ◎ | △ | | ○ | | | | | | | | | | | | | |
| APPLICATION #4 | | △ | ○ | ◎ | ◎ | | | | | | | | | | | | | | |
| APPLICATION #5 | | | | △ | | | | | | | | | | | | | | | |
| APPLICATION #6 | | | ○ | | ◎ | | | | | | | | | | | | | | |
| DEPARTMENT #2 APPLICATION #7 | | | | | | | ◎ | | | | | | | | | | | | |
| APPLICATION #8 | | | | | | | | ◎ | ◎ | | | | | | | | | ◎ | |
| APPLICATION #9 | | | | | | | | △ | | △ | | | | | | | ◎ | | |
| APPLICATION #10 | | | | | | | | | | | ○ | | | | | | | | |
| APPLICATION #11 | | | | | | | | | | △ | ○ | | | | | | ◎ | ◎ | ◎ |
| APPLICATION #12 | | | | | | | | | | | ◎ | ○ | | | | | | | |
| DEPARTMENT #3 APPLICATION #13 | | | | | | | | | | | | | ◎ | △ | | | | | |
| APPLICATION #14 | | | | | | | | | | | | | △ | ◎ | ○ | ○ | | | |
| APPLICATION #15 | | | | | | | | | | | | | | △ | ◎ | △ | | | |
| APPLICATION #16 | | | | | | | | | | | | | | △ | | ◎ | | | |

FIG. 4

| DATA PROPERTIES \ DATA NAMES | | DATA #1 | DATA #2 | ...... | DATA #19 |
|---|---|---|---|---|---|
| DATA SHARING FACTOR | | M | M | | L |
| DATA VALIDITY REQUIREMENT | | R | D | | D |
| APPLICATION NAME | APPLICATION #1 | ◎ | | | |
| | APPLICATION #2 | | ◎ | | |
| | ⋮ | | | | |
| | APPLICATION #16 | | | | |

FIG. 5

APPARATUS FOR SUPPORTING DEVELOPMENT OF INFORMATION PROCESSING SYSTEM

BACKGROUND OF THE INVENTION

1. Field of the Invention

The present invention relates to an apparatus for supporting system development, and more specifically, to an apparatus for supporting development of information processing systems, applicable to integration of distributed computing environments.

2. Description of the Related Art

With advancement of information technologies and expanding use of computers, many companies have introduced information processing systems into their business operations. As the scale of their business grows, a wider variety of computer programs, or applications, will be required to process a diverse range of business data. Further, the applications and data to be processed thereby must dynamically change according to entry into a new market and re-engineering of business practices. As the applications and data change, the business computer systems are naturally required to be reconfigured to stay competitive.

System development tools are provided to meet the above-described needs, which propose optimum configurations of computer systems to suit actual business activities in each enterprise. Not only satisfying the current needs, the tools will also provide a good estimate for a system reconfiguration to be needed in future.

Meanwhile, strong demands for client/server systems have emerged in recent years by greatly improved cost/performance ratios in open system environments, including personal computers and UNIX-based workstations. In fact, development of client/server systems requires precise analysis and study on how to assign the necessary applications and data resources to mixed computer platforms and databases.

However, it is very difficult for the conventional system development tools to support such analysis and study. Historically, traditional computer systems used in most companies were configured as centralized computing environments where a plurality of remote terminals were connected to a single central host computer providing the terminals with various data processing services. The conventional system development tools, therefore, are not ready for heterogeneous environments consisting of a plurality of computer platforms each having different performance. This is why the conventional tools are unable to adapt to client/server systems development which includes complicated total requirements analysis and optimization of application allocation.

SUMMARY OF THE INVENTION

Taking the above into consideration, an object of the present invention is to provide an apparatus for supporting development of distributed information processing systems incorporating a plurality of computers.

To accomplish the above object, according to the present invention, there is provided an apparatus for supporting distributed computer system development. This apparatus comprises the following five elements. A first element is a system pattern database which stores a plurality of system patterns. A second element is project data entry means for entering information concerning applications and data resources to be integrated in the computer system. A third element is application property analyzing means for analyzing the information entered through the project data entry means to obtain application properties of the respective applications. A fourth element is data property analyzing means for analyzing the information entered through the project data entry means to obtain data properties of the respective data resources. A fifth element is system pattern searching means for retrieving, from the system pattern database, at least one system pattern suitable for combinations of the application properties and the data properties.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is a diagram showing the basic form of an application property table;

FIG. 4 is a diagram showing an application-data matrix;

FIG. 5 is a diagram showing a data property table;

DESCRIPTION OF THE PREFERRED EMBODIMENT

An embodiment of the present invention will be described below with reference to the drawings.

Figure 1:
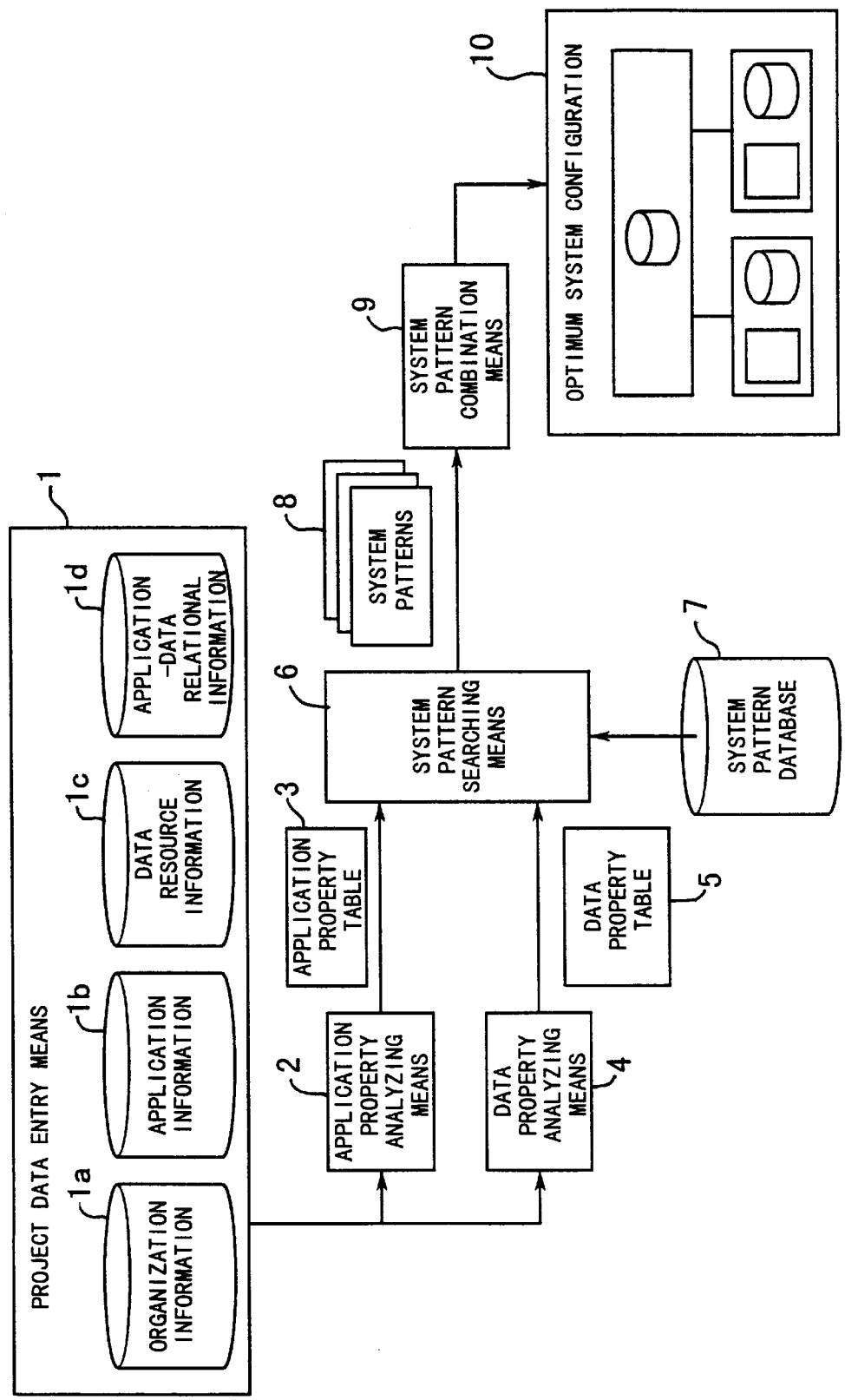
FIG. 1 is a block diagram showing the principle of the present invention.

FIG. 1 is a block diagram showing the principle of a system development workbench according to the present invention. Project data entry means 1 provides functions for entering various information including: organization information 1a of an enterprise that is going to develop and operate a new distributed computing system; application information 1b pertaining to software applications to be provided by the system; data resource information 1c defining data resources to be handled in the system; and application-data relational information 1d describing the association between the applications and the data resources.

Application property analyzing means 2 analyzes nature of each application based on the organization information 1a and application information 1b, thus creating an application property table 3. Likewise, data property analyzing means 4 analyzes nature of each data resource based on the data resource information 1c and application-data relational information 1d, thus producing a data property table 5.

Selecting each of the given applications, system pattern searching means 6 produces combinations of the selected application and the data resources to be processed by the application. And for each combination, it creates a search parameter using the application property table 3 and data property table 5. This results in search parameters as many as the number of application-data combinations.

A system pattern database 7 is prepared beforehand for offering a variety of templates, or system patterns, associated with different search parameters. Each system pattern stored in the database 7 can be of a single system configuration or of a distributed system configuration. The system pattern searching means 6 searches the system pattern database 7 for a system pattern that matches each search parameters, thus extracting a plurality of system patterns 8 corresponding to all possible application-data combinations.

System pattern combination means 9 then combines the system patterns 8 extracted by the system pattern searching means 6, to propose an optimum system configuration 10.

As described above, the system development workbench of the present invention is used to develop an optimum distributed system solution for a given systematization project. The following description will present a detailed explanation for this process.

Upon reception of a system development request, the project data entry means 1 outputs messages to a display screen to prompt the operator to enter a set of data describing the requirements of business processes to be systematized. According to the prompting messages from the project data entry means 1, the operator enters organization information 1a, application information 1b, data resource information 1c, and application-data relational information 1d.

The organization information 1a is a list of the names of organization units such as departments involved in the group and some smaller sections that undertake specific operations in the departments. The operator enters such information according to the hierarchical structure of the organization.

The application information 1b is a set of specifications of applications that will be processed by the system now under development. The operator enters application names such as product price quotation and order entry. In addition to the application names, the operator inputs some parameters that indicate temporal invariance of each application. Every application has its own life cycle. The parameters indicate the intervals of changes that will happen to each application rule. The temporal invariance of such long-life applications that will last without change for, say, more than five or ten years will be rated as "routine" applications. For middle-life applications that will live for two to five years, their temporal invariance is ranked "dynamic." Short-life applications that are expected to change within two years, for example, are categorized into "non-routine" applications. The operator is also requested to specify the names of organization units that are involved in each application entered, selecting from those registered in the organization data 1a.

The data resource information 1c contains a listing of data resources to be processed by the applications. For example, the operator enters product information, order status, inventory conditions, and the like.

The application-data relational information 1d describes association between each application entered as part of the application information 1b and data resources used in the application. The application-data relational information 1d also includes information on what type of operations the application will apply to the data resources, where the operations are classified into four types of: create, read, update, and delete. The application-data relational information 1d further includes "data validity requirements" for each data resource handled in the applications. The data validity requirements indicate how long the data resources remain valid. That is, it is set to "real-time" when the data resource loses validity in a short time, or it is rated "delay-tolerant" when the data resources stay valid for a long time and the applications are thus allowed to fetch them not immediately but with some time delays.

Upon completion of entry of the foregoing information, the application property analyzing means 2 compiles the application property table 3 from the organization information 1a and application information 1b. FIG. 2 shows the basic form of this application property table 3, in which all applications included in the application information 1b are classified by two factors: spatial diversity and temporal invariance of applications. The spatial diversity of applications is valued as: large scale (enterprise-wide), medium scale (intra-department), or small scale (personal). Similarly, the temporal invariance is classified into the following three groups: long term (routine), middle term (dynamic), and short term (non-routine). Every application belongs to either one of the nine combinatorial patterns of those two multiple-valued factors. As for the spatial diversity of applications, the medium-scale applications can further be subdivided into smaller groups corresponding to respective departments. Likewise, the small-scale applications can further be subdivided into as many groups as the number of employees.

Figure 3:
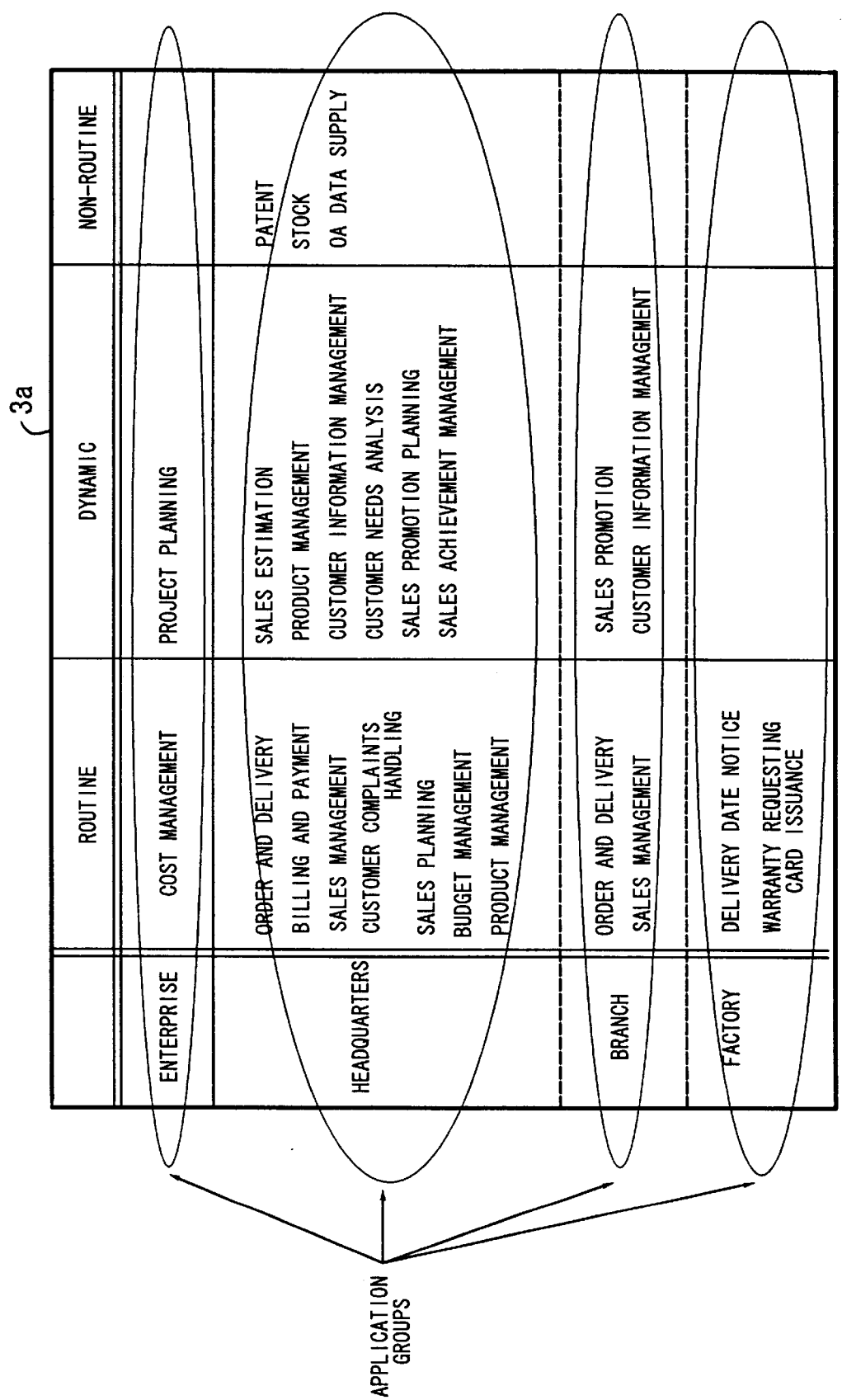
FIG. 3 is a diagram showing an example of the application property table.

FIG. 3 shows an example of the application property table. In this example application property table 3a, the applications are classified in terms of spatial diversity, into four groups of: "enterprise," "headquarters," "branch," and "factory." In reference to the classification legends in FIG. 2, the enterprise applications are large-scale applications, and the headquarters, branch, and factory applications are middle-scale applications. There is no small-scale application in this example case. In the aspect of temporal invariance, the applications are fully classified into three categories of "routine," "dynamic," and "non-routine." Meanwhile, the applications that are bundled under different criteria will form some separate sets of applications called "application groups" as shown in FIG. 3.

Returning to FIG. 1, the application property analyzing means 2 selects each application out of the application information 1b as a subject of analysis, and it then examines what organization units are registered as the users of that subject application. If it is found that the users are widely distributed over a plurality of departments, the application is entered to an "enterprise" application group. If the users are concentrated in a particular department, the application is categorized into a "department" application group corresponding to that particular department. Take applications of "delivery date notice" and "cost management," for example. Since the "delivery date notice" application is only used by factory people, it will be included in a "factory" application group. On the other hand, since the other application, "cost management," is expected to have enterprise-wide users, it will be a member of the enterprise application group.

After determining appropriate application groups, the application property analyzing means 2 determines the temporal invariance property of the selected application, which is just what was entered as part of the application information 1b as being either "routine," "dynamic," or "non-routine." The application property analyzing means 2 thus finishes the application property table 3.

In parallel with the above-described process by the application property analyzing means 2, the data property analyzing means 4 creates a data property table 5, analyzing the data resource information 1c and application-data relational information 1d.

This data property table 5 classifies every data resource by the degree of sharing and validity requirement. Here, the data validity requirement is just what was entered as part of the application-data relational information 1d. The degree of sharing, or "data sharing factor," is obtained through analysis of an application-data matrix as described below.

FIG. 4 illustrates an application-data matrix 20, on which all data resources are mapped. The rows of this two-dimensional matrix indicate the applications and the columns show the data resources. The illustrated matrix 20 is used to analyze a information processing system with sixteen applications (#1–#16) and nineteen data resources (#1–#19). The applications #1–#6 belong to the "first department" application group, and the applications #7–#11 and #12–#16 are included in the "second department" and "third department" application groups, respectively.

Association between a particular application and relevant data resources is represented in the matrix 20 with three symbols indicative of possible operations applied to the data resources: "◉" for the "create" operation, "○" for the update operation, and "Δ" for the read operation.

With this matrix, the data sharing factor of each data resource will be determined as follows. The data resources #1–#19 shown in FIG. 4 are divided into four data groups 21–24. The data resources #1–#6 in the data group 21 are accessed by the first department only. The data group 22 contains the data resources #7–#12 used only by the second department, and the data group 23 includes the data resources #13–#16 exclusive to the third department. The last data group 24, including the data resources #17–#19, are widely used in the enterprise.

Because the first three data groups 21–23 are dedicated to their respective departments, their data sharing factors are all ranked "middle-range sharing." On the other hand, the data group 24 are shared by multiple departments, and thus it is rated "wide-range sharing."

Now that the data sharing factors are ready, the data property analyzing means 4 creates a data property table, as illustrated in FIG. 5. A data property table 5a is composed of data sharing factors, data validity requirements, and application-data matrix. The rating of the data sharing factors is represented with three symbolic characters "W," "M," and "N," respectively denoting "wide-range sharing" (i.e., enterprise-wide sharing), "middle-range sharing" (i.e., intra-department sharing), and "no sharing" (no instances for this shown in FIG. 5). The data validity requirements are indicated by a symbol "R" (i.e., real-time) or "D" (i.e., delay-tolerant).

The application-data matrix illustrated in FIG. 4 was simple and easy to analyze. In reality, however, the matrix can be much more complicated than the one shown in FIG. 4. If it is the case, the data sharing factors must be determined with some complex criteria or thresholds as will be described later on.

Every application and data resource will finally belong to either one of a plurality of system environments constituting a total operational system of the enterprise. A list of such system environments, which is necessary for allocating and integrating of the applications and data resources, can be created in parallel with the process of determining data sharing factors.

The following description will provide definition of an original system environment model. The present invention adopts a system environment model shown in FIGS. 6(A) and 6(B).

Figure 6A:
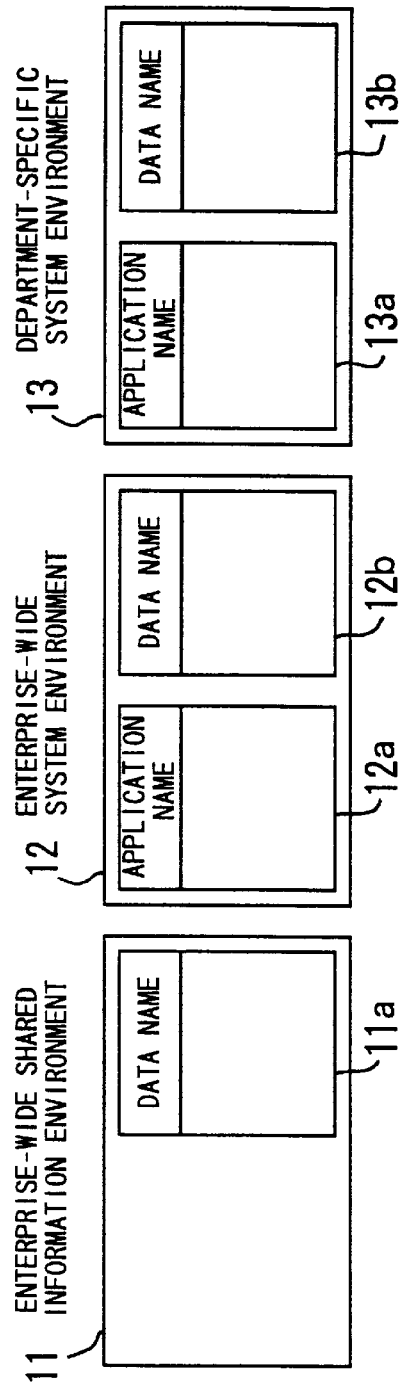
FIG. 6(A) is a diagram showing three kinds of system environments.

FIG. 6(A) shows three kinds of system environments. Namely, the system environments include an enterprise-wide shared information environment 11, an enterprise-wide system environment 12, and a department-specific system environment 13. The enterprise-wide information sharing environment 11 allows all the organization units in the enterprise to share some common data resources. The names of the shared resources are specified in a data name list 11a. The enterprise-wide system environment 12 provides applications and data resources that are widely used in the enterprise, having an application name list 12a and a data name list 12b for this purpose. The department-specific system environment 13, having an application name list 13a and a data name list 13b, is an environment separately constructed for each department to supply dedicated applications and data resources thereto.

Figure 6B:
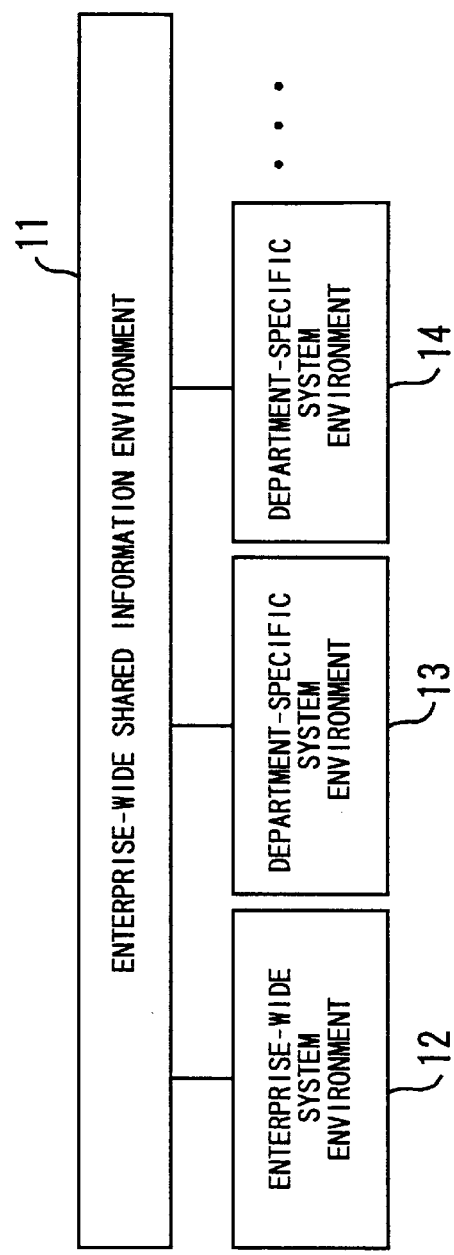
FIG. 6(B) is a diagram showing the logical structure of multiple system environments.

FIG. 6(B) depicts the logical structure model of such a hierarchical system environment. The enterprise-wide information sharing environment 11 serves as the key system environment, under which the other environments (i.e., the enterprise-wide system environment 12 and the department-specific system environments 13, 14, etc.) are arranged in parallel. Note that there are as many department-specific system environments as the number of departments.

It is possible to identify to which system environment a particular application should belong, by referring to the application group in which the application is included. For example, applications in an "enterprise" application group, which covers a large-scale spatial range, should belong to the enterprise-wide system environment. Applications classified as middle-scale or small-scale should belong to one of the department-specific system environments which is identified by the same label as that of the application group they belong to.

Assuming the above-described system environment model, the system development workbench shown in FIG. 1 will execute a process of calculating data sharing factors and creating a system environment list, as described below.

Figure 7:
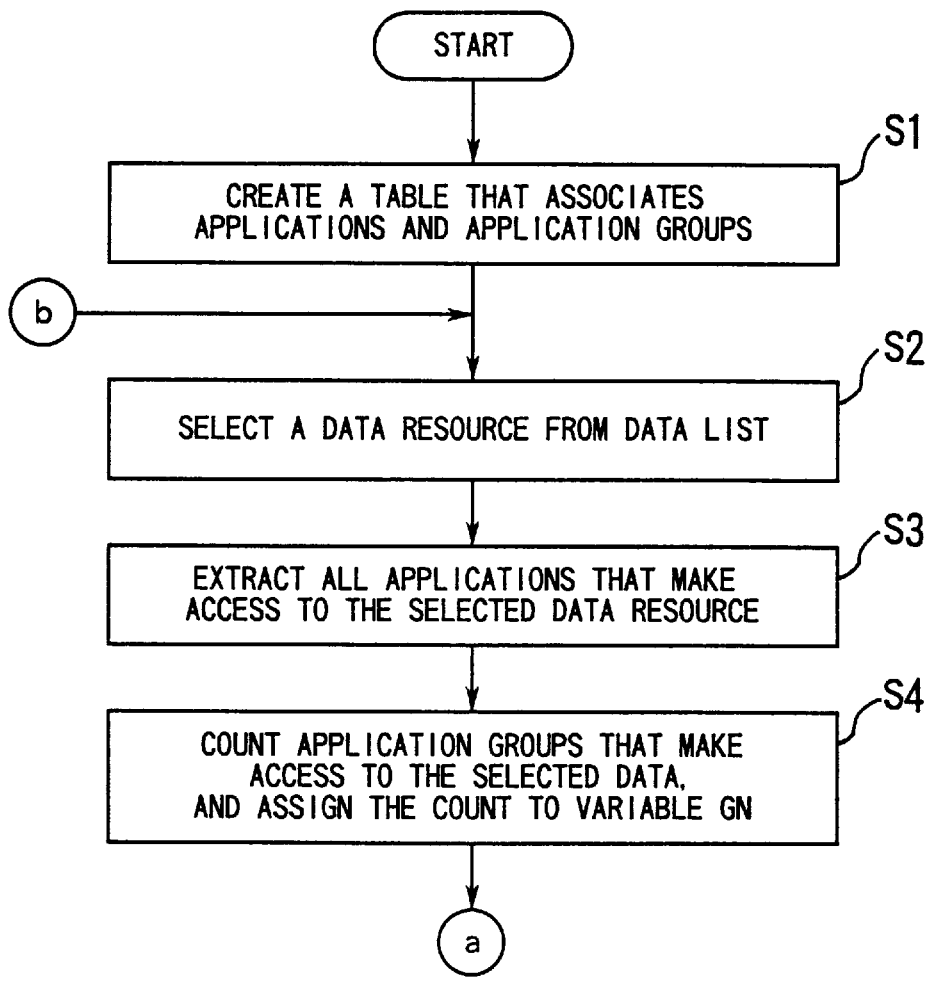
FIGS. 7 and 8 are flowcharts respectively showing the first and second halves of a process of calculating data sharing factors and generating a system environment list.

FIG. 7 is a flowchart showing the first half (S1–S4) of the process to calculate data sharing factors and create a system environment list, which is performed by the data property analyzing means 4 in FIG. 1. Here, a first threshold value m1 is defined to determine whether the data sharing factor should be "wide-range sharing" or "middle-range sharing," while a second threshold value m2 is predefined to distinguish between the "middle-range sharing" and "no sharing." Before starting the process, the data property analyzing means 4 initializes the system environment list so that it will only include an enterprise-wide information sharing environment.

[S1] Consulting the application property table 3, the data property analyzing means 4 creates a cross-reference table that associates applications with application groups. At the same time, each application group is uniquely labeled.

[S2] The data property analyzing means 4 selects one data resource out of a data resource list as part of the data resource information 1c.

[S3] Out of the application-data relational information 1d, the data property analyzing means 4 extracts all the applications that make access to the data resource selected in step S2.

[S4] Using the cross-reference table created in step S1, the data property analyzing means 4 counts the application groups that make access to the data resource selected in step S2, and then assigns the count to a variable GN.

Figure 8:
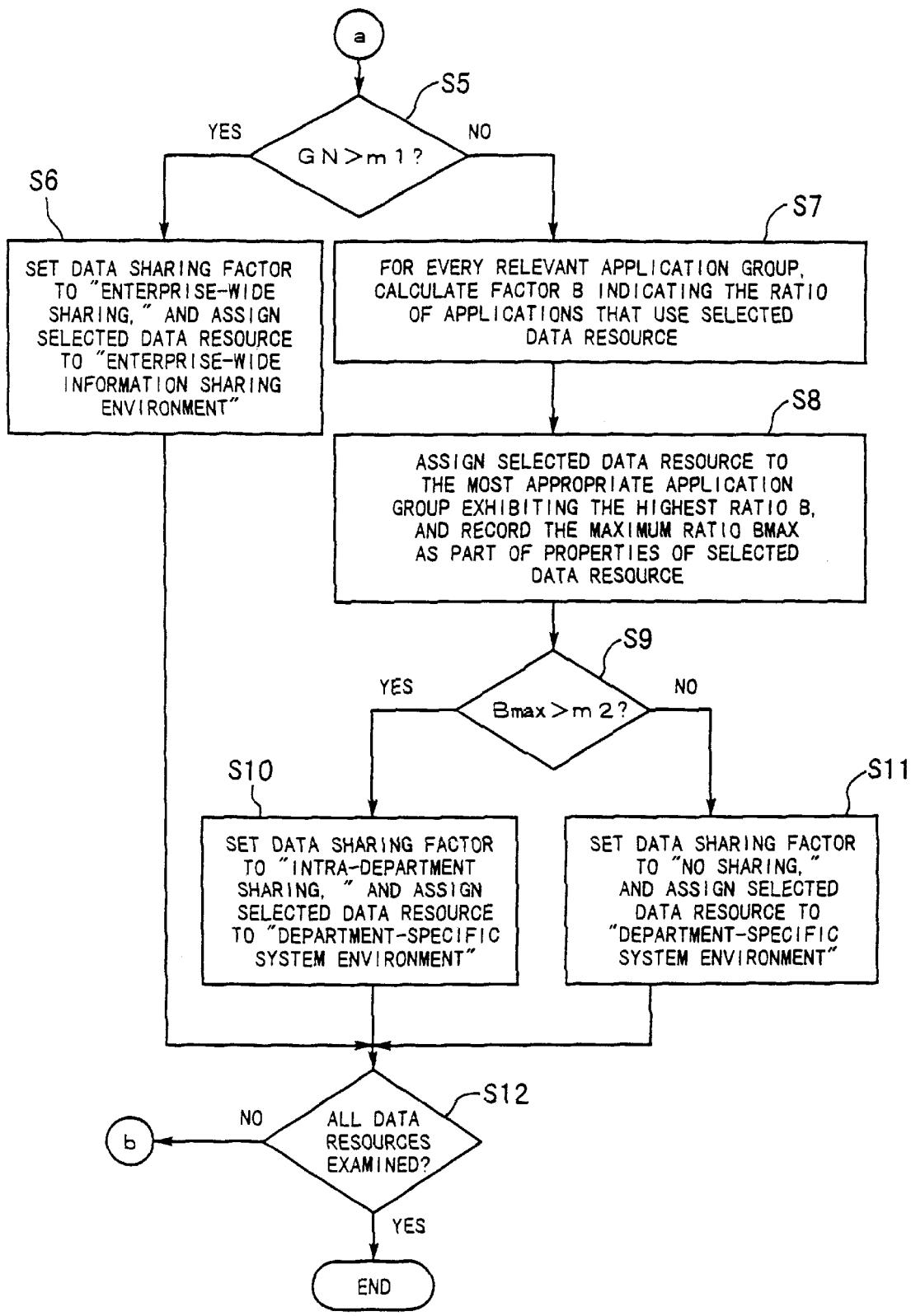

FIG. 8 is a flowchart showing the second half (S5–S12) of the process.

[S5] It is examined whether the variable GN is greater than the first threshold m1 or not. If GN is greater than m1, then the process advances to step S6. Otherwise, the process goes to step S7.

[S6] The data sharing factor of the selected data resource is set to "enterprise-wide sharing," and the data resource is assigned to the enterprise-wide information sharing environment.

[S7] For each application group that makes access to the selected data resource, a factor B indicating the ratio of the applications that make access to the data resource is calculated. Let Bi be such a ratio of the i-th application group, where i is an integer. This i-th ratio Bi is calculated as $$Bi = NAi/NGi \qquad (1)$$

where NAi is the number of applications in the i-th application group which make access to the data resource and NGi is the number of applications in the i-th application group. This step S7 yields as many values of B as the application groups that make access to the selected data resource.

[S8] The selected data resource is assigned to the most appropriate application group, which exhibits the highest ratio B among those make access to that data resource. The site for the selected data resource can be settled in this way, even when there are many application groups that make access to it. That ratio, or the maximum ratio Bmax, is recorded as part of the unique properties of the selected data resource.

[S9] It is examined whether the maximum ratio Bmax is greater than the second threshold m2 or not. If Bmax is greater than m2, the process advances to step S10. Otherwise, the process proceeds to step S11.

[S10] The data property analyzing means 4 sets the data sharing factor of the selected data resource to "intra-department sharing." It then assigns the selected data resource to one of the department-specific system environments, and registers that system environment to the system environment list under construction. The registered system environment will have the same label as that of the application group to which the selected data resource belongs. It is not allowed that a plurality of system environments share the same label. The data property analyzing means 4 will unify such environments, if happened, into a single environment.

[S11] The data property analyzing means 4 sets the data sharing factor of the selected data resource to "no sharing," and performs registration and labeling of a relevant department-specific system environment in the same way as step S10.

[S12] It is tested whether all data resources have been examined or not. If there remains an unexamined data resource, the process returns to step S2 in FIG. 7. If all data resources are finished, the process will be terminated.

The data sharing factors and system environments determined in steps S6, S10, and S11 are appended to the data resource information 1c as supplemental information. The system environment list finally obtained at the end of the above process is also saved in a storage unit.

It should be noted here that the flowchart in FIGS. 7 and 8 does not include any steps to define the enterprise-wide system environment 12. The enterprise-wide system environment 12 is constructed after completion of the above steps, if there are such applications that are widely shared across the enterprise.

In the way described above, the application property table 3 and data property table 5 are created by the application property analyzing means 2 and data property analyzing means 4, respectively. These two tables are then sent to the system pattern searching means 6. The system pattern searching means 6 searches the system pattern database 7 for a system pattern that suits each combination of applications and data resources. The following will describe the details of this search process.

The system pattern searching means 6 selects one application after another and extracts all data resources relevant to the selected application, consulting the aforementioned application-data matrix 20 stored as part of the data property table 5. The system pattern searching means 6 then generates some search parameters by joining an application property parameter and data property parameters, according to each combination of the selected application and relevant data resources. The generated search parameters are used as key information to locate appropriate system patterns.

For more specific description, assume that the system pattern searching means 6 has selected the first application (APPLICATION #1 shown in FIGS. 4 and 5). It is also assumed that the application property parameter of the APPLICATION #1 is known as APPLICATION #1 (intra-department, routine)

Out of the data property table 5, the system pattern searching means 6 extracts data resources used by the APPLICATION #1. They are DATA #1, DATA #3, DATA #5, and DATA #17, whose data property parameters are expressed as follows:

DATA #1 (intra-department sharing, real-time)
DATA #3 (intra-department sharing, real-time)
DATA #5 (intra-department sharing, delay-tolerant)
DATA #17 (enterprise-wide sharing, delay-tolerant)

The system pattern searching means 6 then concatenates the above application property parameter and data property parameters, thus obtaining the following search parameters #1–#4.

SEARCH PARAMETER #1 [APPLICATION #1 (intra-department, routine)—DATA #1 (intra-department sharing, real-time)]
SEARCH PARAMETER #2 [APPLICATION #1 (intra-department, routine)—DATA #3 (intra-department sharing, real-time)]
SEARCH PARAMETER #3 [APPLICATION #1 (intra-department, routine)—DATA #5 (intra-department sharing, delay-tolerant)]
SEARCH PARAMETER #4 [APPLICATION #1 (intra-department, routine)—DATA #17 (enterprise-wide sharing, delay-tolerant)]

With the search parameters #1–#4 defined above, the system pattern searching means 6 will search the system pattern database 7.

Figure 9:
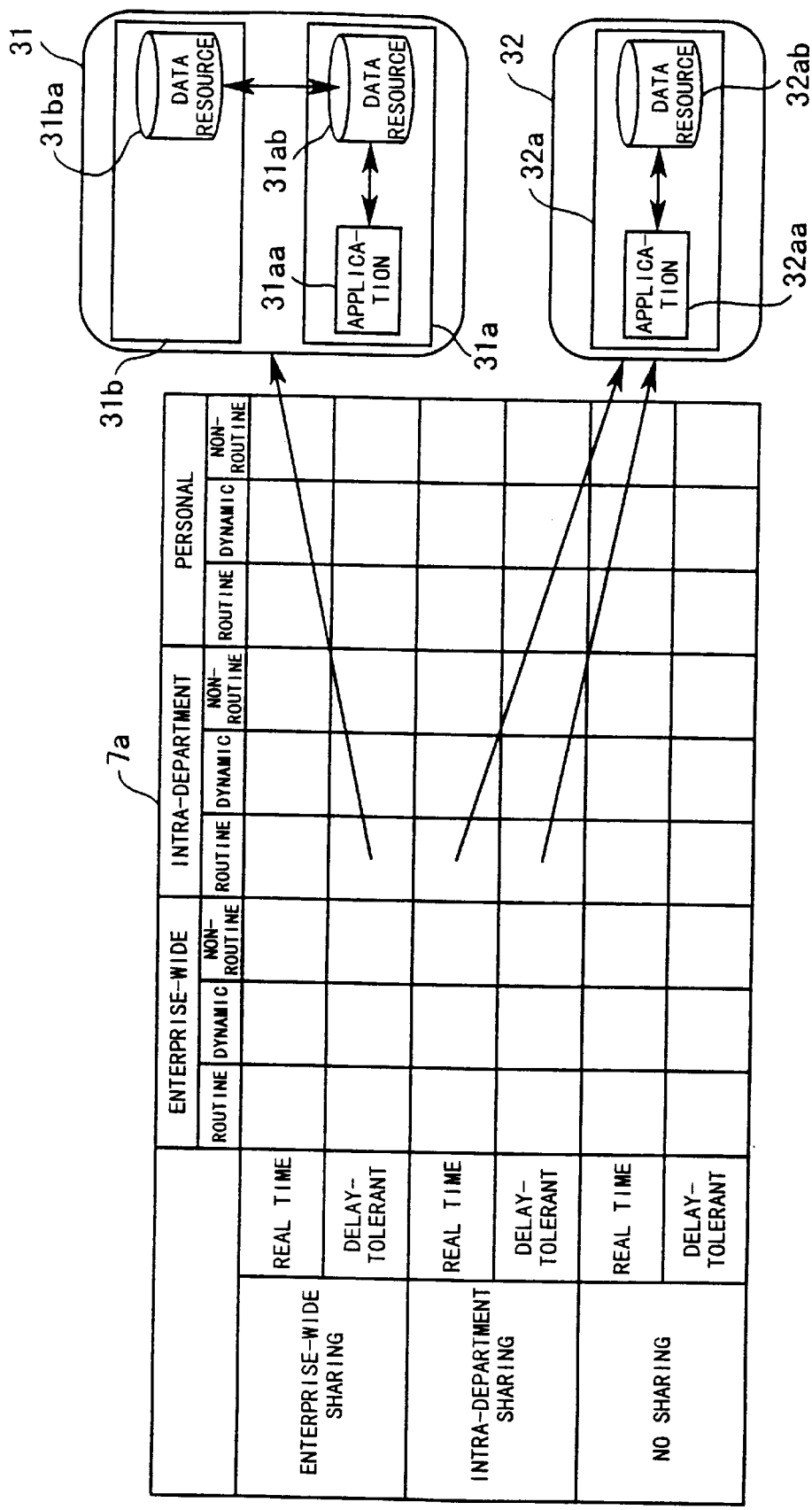
FIG. 9 is a diagram showing data structure of a system pattern database.

FIG. 9 presents a conceptual view of the data structure of the system pattern database 7. Logical structure 7a of the system pattern database 7 is expressed in matrix form. The rows represent data property parameters and the columns represent application property parameters, where different system patterns are mapped at different intersections of the rows and columns, i.e., components of the matrix.

As a result of searching the system pattern database 7 with the search parameters for APPLICATION #1, the system pattern searching means 6 can reach a system pattern 31 through SEARCH PARAMETER #4 and another system pattern 32 through SEARCH PARAMETERS #1–#3.

The system pattern 31 is a system pattern defined as a matrix component corresponding to a combination of application property (intra-department, routine) and data property (enterprise-wide sharing, delay-tolerant). This pattern comprises a local system environment 31a and a remote system environment 31b. The contrastive wording "local and remote" implies here that the viewpoint is placed at the application. While the local system environment 31a has an application 31aa and data resource 31ab, the remote system environment 31b has a data resource 31ba only. File transfer facilities are provided between the local data resource 31ab and the remote data resource 31ba.

The system pattern 32, on the other hand, is a system pattern commonly defined for two matrix elements; one is a combination of an application property (intra-department, routine) and a data property (intra-department sharing, real-time), and the other is a combination of an application property (intra-department, routine) and a data property (intra-department sharing, delay-tolerant). This pattern 32 has only a local system environment 32a with an application 32aa and a data resource 32ab.

In that way, a plurality of system patterns are extracted for every single application. Such a set of system patterns extracted for a single application will be directed to the system pattern combination means 9. The system pattern combination means 9 combines the received system patterns as follows.

Figure 10:
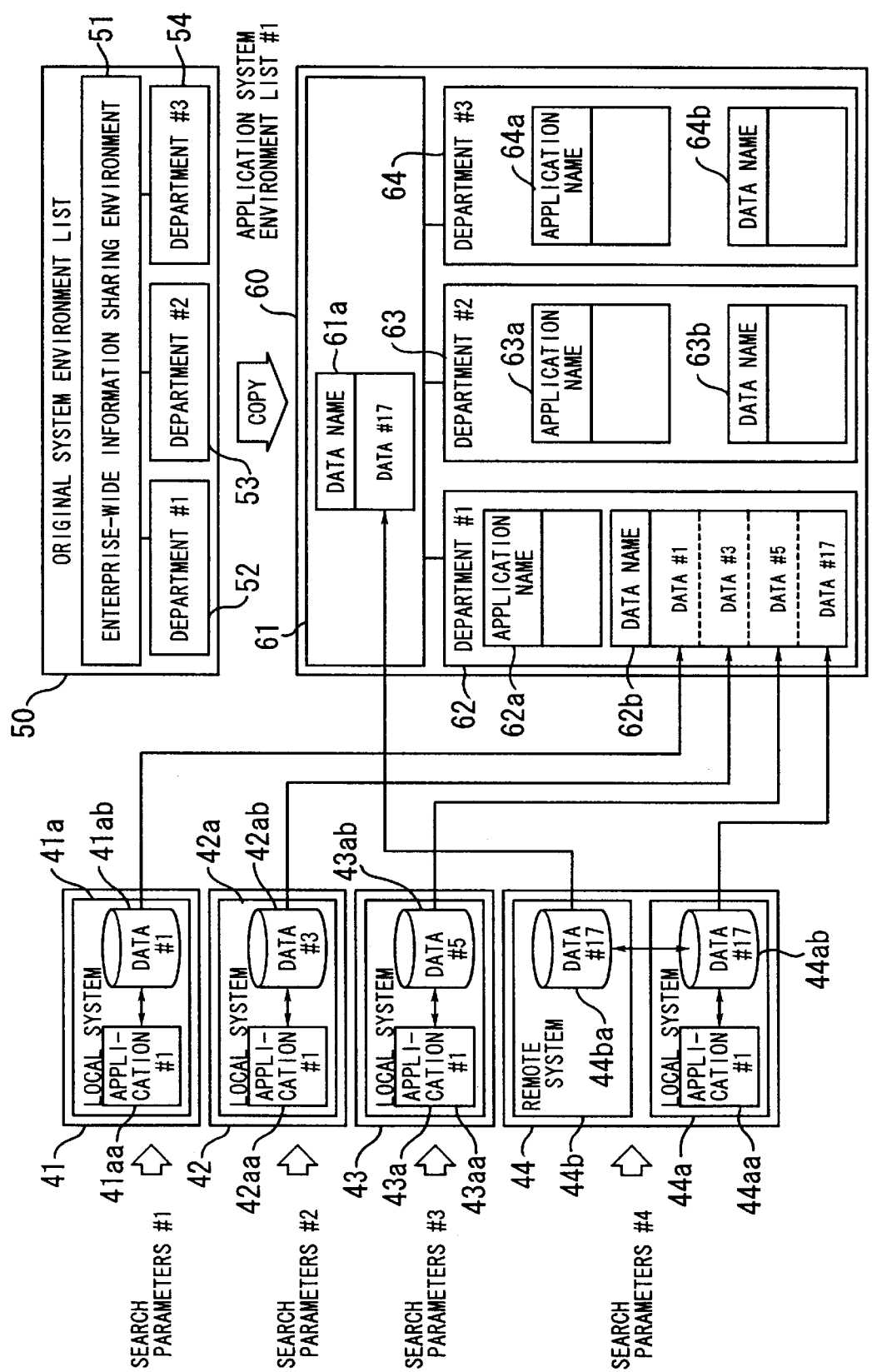
FIG. 10 is a diagram showing an example of combination of system patterns for each application.

FIG. 10 shows an example of combination of system patterns for a single application, which specifically shows how the system patterns extracted for APPLICATION #1 will be combined into a single system pattern. Four system patterns 41–44 before being combined are shown in the left half of FIG. 10. They are:

(1) System pattern 41 extracted with SEARCH PARAMETER #1, having only a local system 41a including APPLICATION #1 41aa and DATA #1 41ab;

(2) System pattern 42 extracted with SEARCH PARAMETER #2, having only a local system 42a including APPLICATION #1 42aa and DATA #3 42ab;

(3) System pattern 43 extracted with SEARCH PARAMETER #3, having only a local system 43a including APPLICATION #1 43aa and DATA #5 43ab; and (4) System pattern 44 extracted with SEARCH PARAMETER #4, having both a local system 44a including APPLICATION #1 44aa and DATA #17 44ab and a remote system 44b including DATA #17 44ba.

Before joining those system patterns 41–44, the system pattern combination means 9 first makes a copy of an original system environment list 50, which will serve as the basic model for compiling an application system environment list. The original system environment list 50 contains: an enterprise-wide information sharing environment 51 and three department-specific system environments 52, 53, and 54 respectively for the departments #1, #2, and #3.

The system pattern combination means 9 now starts compiling an application system environment list #1 60.

Being derived from the copy of the original system environment list 50, the application system environment list #1 60 initially has an enterprise-wide information sharing environment 61 and three department-specific system environments 62, 63, and 64 respectively prepared for the departments #1, #2, and #3. This enterprise-wide information sharing environment 61 is equipped with a data name list 61a, while the department-specific system environments 62–64 have application name lists 62a–64a and data name lists 62b–64b, respectively. Those application name lists and data name lists are blank at this stage.

The system pattern combination means 9 enters the names of data resources contained in the system patterns 41–44 to the application system environment list #1 60 in the following manner. Since the local system defined in the system pattern 41 actually corresponds to the department #1, the name of the data resource 41ab should be entered to the data name list 62b of the department-specific system environment 62 for the department #1. Likewise, the data resources 42ab, 43ab, and 44ab will be registered to the same data name list 62b. The name "DATA #17" of the data resource 44ba defined as the remote data resource in the remote system 44b of the system pattern 44 will be registered solely to the data name list 61a in the enterprise-wide information sharing environment 61.

As a result, the data name list 61a in the enterprise-wide information sharing environment 61 obtains a new entry, DATA #17, and the data name list 62b in the department-specific system environment 62 for department #1 acquires four new entries, DATA #1, #3, #5, and #17.

In the same way as described above, the system pattern combination means 9 creates application system environment lists for the other applications. When it finished creating all the lists, the system pattern combination means 9 proceeds to the next stage—integration of the finished application system environment lists.

Figure 11:
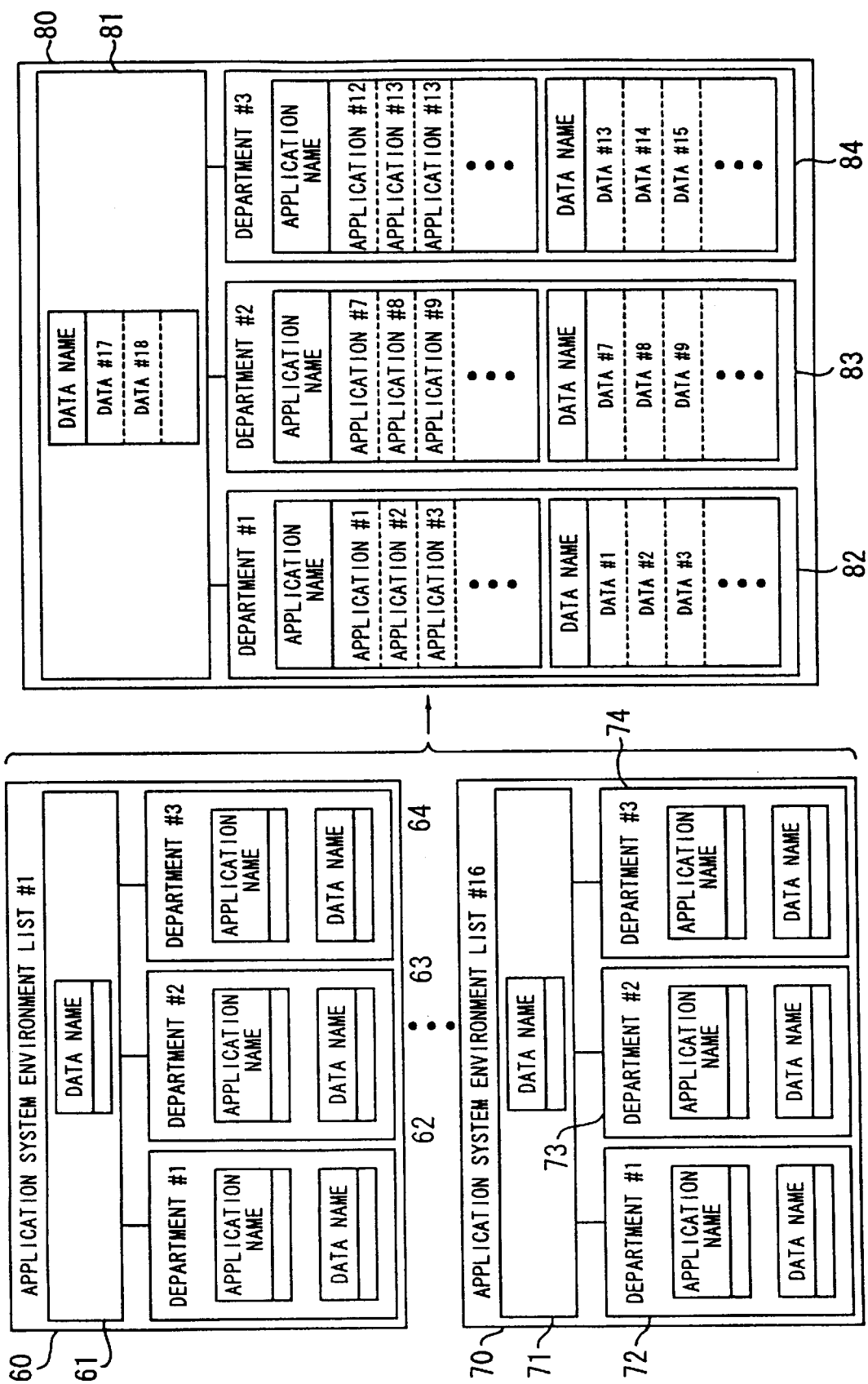
FIG. 11 is a diagram showing an example of integration of application system environment lists.

FIG. 11 is a diagram showing an example of integration of application system environment lists. The left half of FIG. 11 represents sixteen application system environment lists for APPLICATIONS #1–#16, although only two instances (#1 and #16) are depicted in detail. Application system environment lists 60 and 70 for APPLICATIONS #1 and #16 are composed of enterprise-wide information sharing environments 61 and 71, department-specific system environments 62 and 72 for department #1, department-specific system environments 63 and 73 for department #2, and department-specific system environments 64 and 74 for department #3, respectively. Also, the other application system environment lists for APPLICATIONS #2–#15 have the same internal structure as above. The system pattern combination means 9 copies the names of data resources contained in each of the application system environment lists #1–#16 to a total system environment list 80, as well as entering the names of applications to the same list 80. Each data name list, however, cannot hold two or more entries of the same data resource name.

Finally, the total system environment list 80 obtains an enterprise-wide information sharing environment 81 and department-specific system environments 82, 83, and 84 for the departments #1, #2, and #3, respectively, in which environments all the applications and data resources are registered. This total system environment list 80 is thus finalized as a proposed optimum system configuration.

Figure 12:
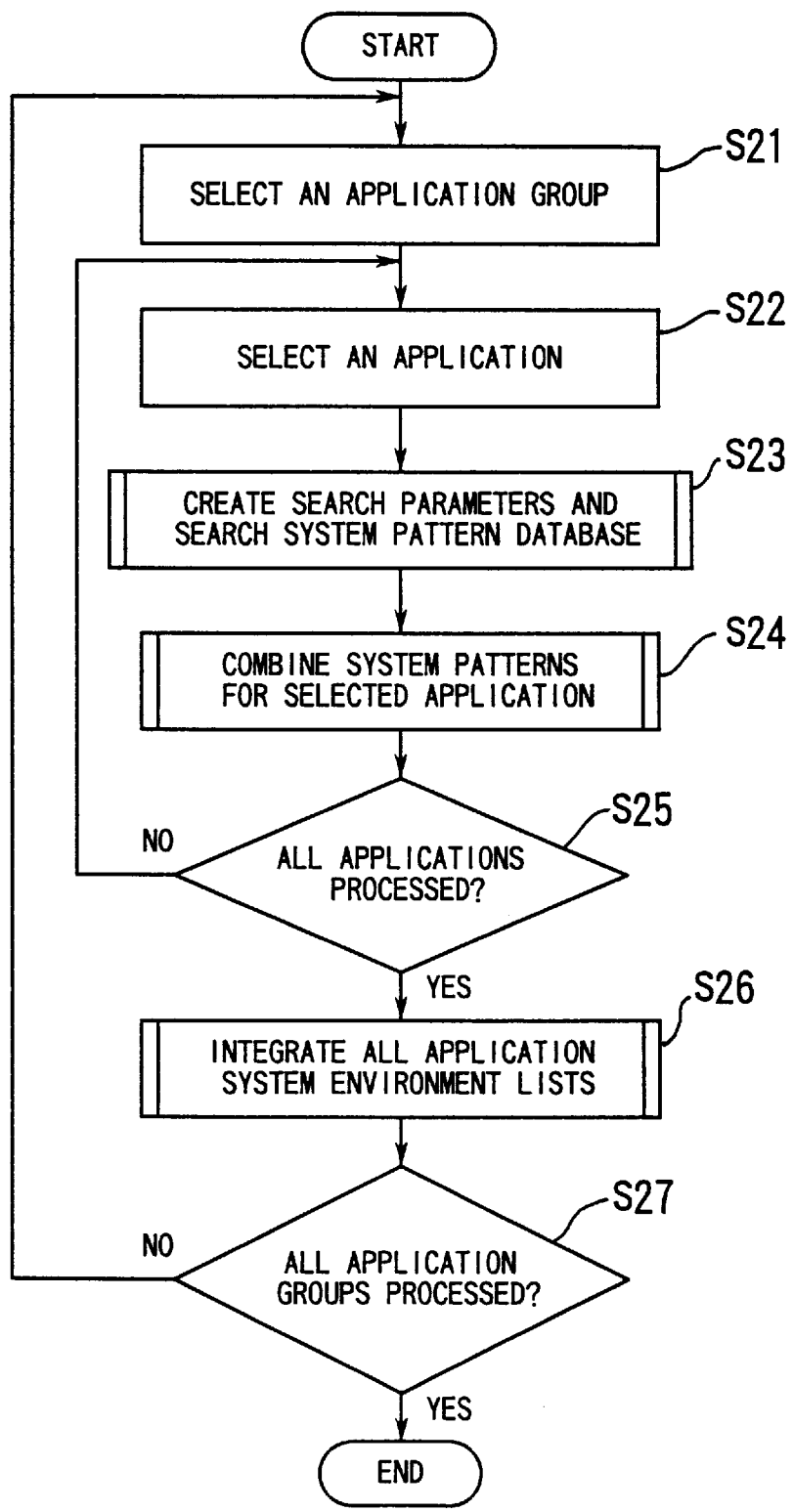
FIG. 12 is a flowchart showing a process executed by system pattern searching means and system pattern combination means.

The following description will explain in detail a process executed by the system pattern searching means 6 and system pattern combination means 9, with reference to a flowchart in FIG. 12. The system pattern searching means 6 performs steps S21–S23, S25, and S27, while the system pattern combination means 9 executes steps S24 and S26.

[S21] The system pattern searching means 6 selects one application group from among the application groups organized by using the application property table 3.

[S22] The system pattern searching means 6 then selects one application out of the applications belonging to the selected application group.

[S23] The system pattern searching means 6 creates search parameters corresponding to every possible combination of the selected application and its relevant data resources. It then searches the system pattern database 7 using the search parameters created, thus extracting system patterns as many as the data resources that the selected application uses. Full details of this step S23 will be described later with reference to FIG. 13.

[S24] The system pattern combination means 9 combines the system patterns extracted in step S23, thereby creating an application system environment list for the selected application. Full details of this step S24 will be presented later with reference to FIG. 14.

[S25] The system pattern searching means 6 tests whether all the available applications have been finished or not. If all the applications are done, the process advances to step S26. Otherwise, the process returns to step S22.

[S26] The system pattern combination means 9 integrates the application system environment lists for all the applications into a total system environment list. Details of this step will be described later with reference to FIG. 15.

[S27] The system pattern searching means 6 examines whether all the application groups have been finished or not. If all the application groups are finished, the process will be terminated. Otherwise, the process returns to step S21.

Figure 13:
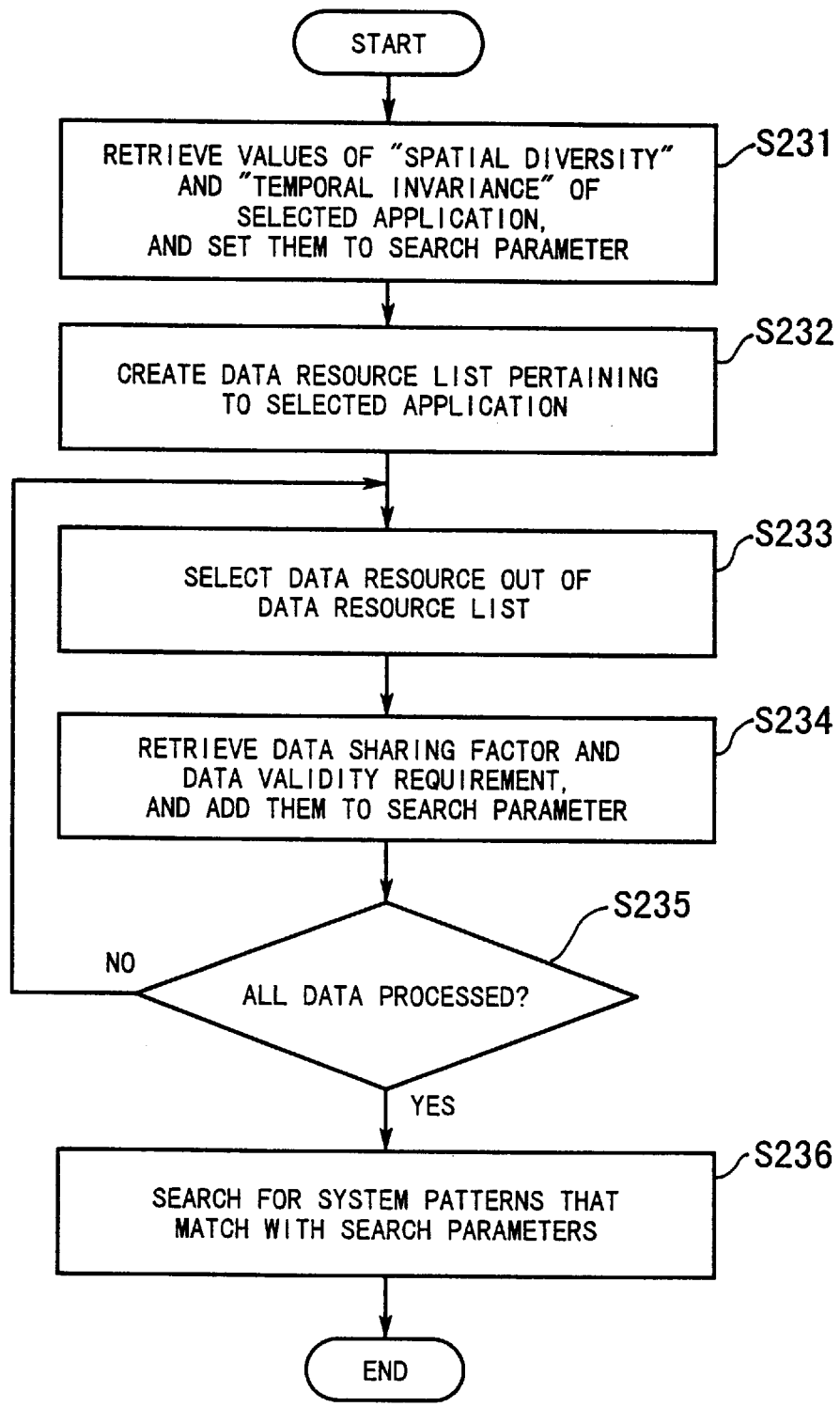
FIG. 13 is a flowchart showing a detailed process of creating search parameters and searching the system pattern database.

FIG. 13 is a flowchart showing the detailed process of step S23 for creating search parameters and searching the system parameter database.

[S231] Consulting the application property table 3, the system pattern searching means 6 retrieves the property values of "spatial diversity" and "temporal invariance" of the selected application, and it sets a search parameter with those retrieved values.

[S232] Consulting the data property table 5, the system pattern searching means 6 produces a list of data resources that are used by the selected application.

[S233] The system pattern searching means 6 selects one data resource out of the data resource list produced in step S232.

[S234] Consulting the data property table 5, the system pattern searching means 6 retrieves the data sharing factor and data validity requirement, and it sets them as part of the search parameter. This step S234 thus makes up the search parameter corresponding to the selected application and the selected one of the data resources used by that application.

[S235] The system pattern searching means 6 tests whether it has processed all relevant data resources or not. If all the data resources are finished, the process proceeds to step S236. Otherwise, the process returns to step S233, thereby repeating production of search parameters as many times as the number of data resources concerned.

[S236] The system pattern searching means 6 searches the system pattern database 7 for the system patterns matching with the respective search parameters, and it stores the found system patterns into a storage unit. Those system patterns are managed in the storage unit in such a way that they can be associated with relevant search parameters and data resource names.

Figure 14:
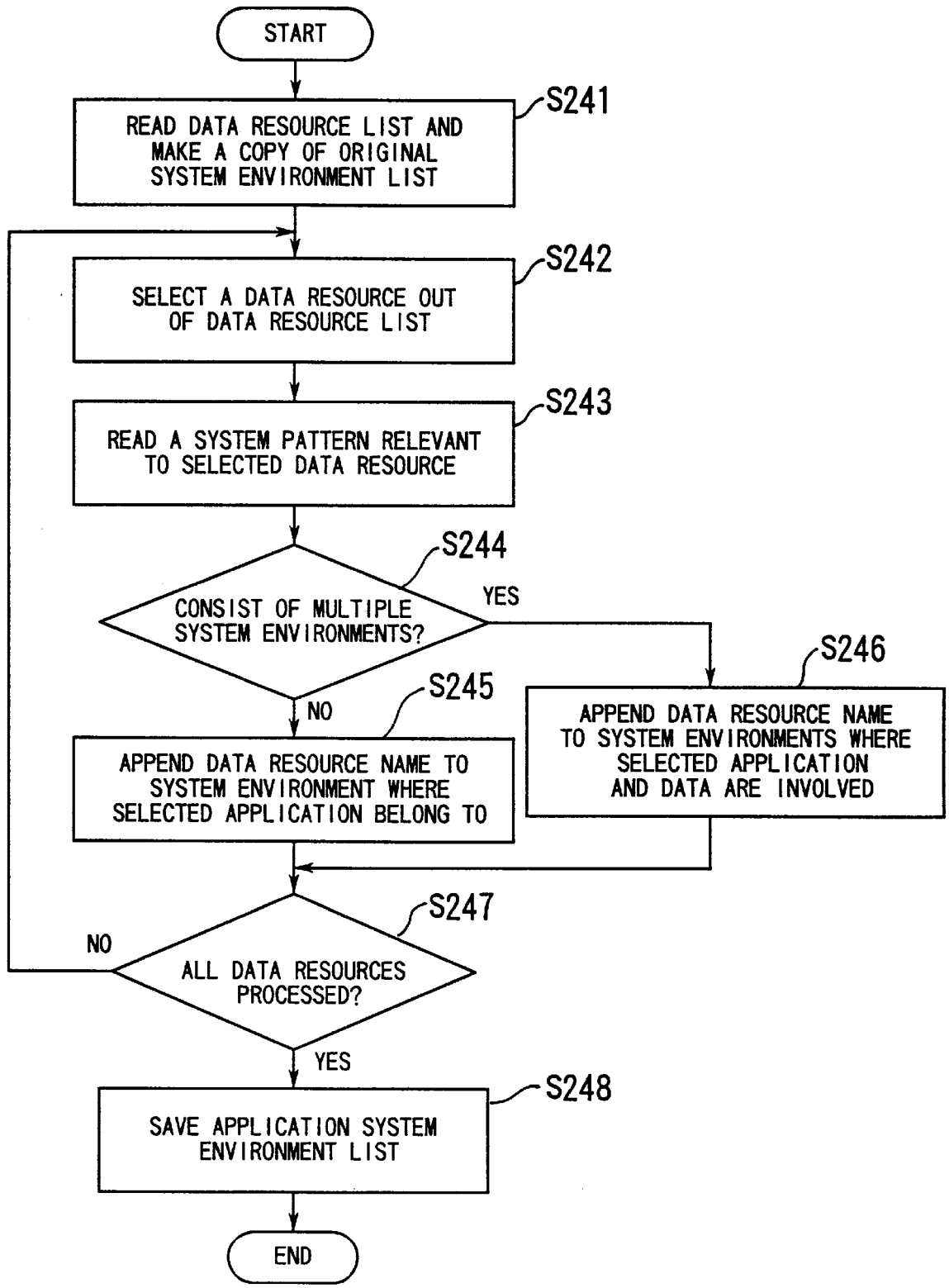
FIG. 14 is a flowchart showing a detailed process of combining system patterns for a single application.

FIG. 14 is a flowchart showing the detailed process of step S24 for combining system patterns relevant to the selected application.

[S241] The system pattern combination means 9 makes a copy of the original system environment list, as well as reading the data resource list produced by the system pattern searching means 6 in step S232 of FIG. 13.

[S242] Out of the data resource list, the system pattern combination means 9 selects one data resource.

[S243] The system pattern combination means 9 reads out the system patterns relevant to the selected data resource, from among those stored in the storage unit by the system pattern searching means 6 in step S236 of FIG. 13.

[S244] It is examined whether the system patterns range over a plurality of system environments or concentrate in a single system environment. If they concentrate in a single system environment, the process advances to step S245. If they range over a plurality of system environments, the process branches to step S246.

[S245] The system pattern combination means 9 appends the name of the selected data resource to the data name list in the system environment to which the selected application will belong.

[S246] The system pattern combination means 9 appends the name of the selected data resource to the data name lists in the system environments to which the selected application and/or selected data resource will belong.

[S247] The system pattern combination means 9 examines whether all the data resources have been processed or not. If all the data resources are finished, the process proceeds to step S248. If there is unfinished one, the process returns to step S242.

[S248] The finished system environment list is stored as an application system environment list descriptive of the environment for the selected application.

Figure 15:
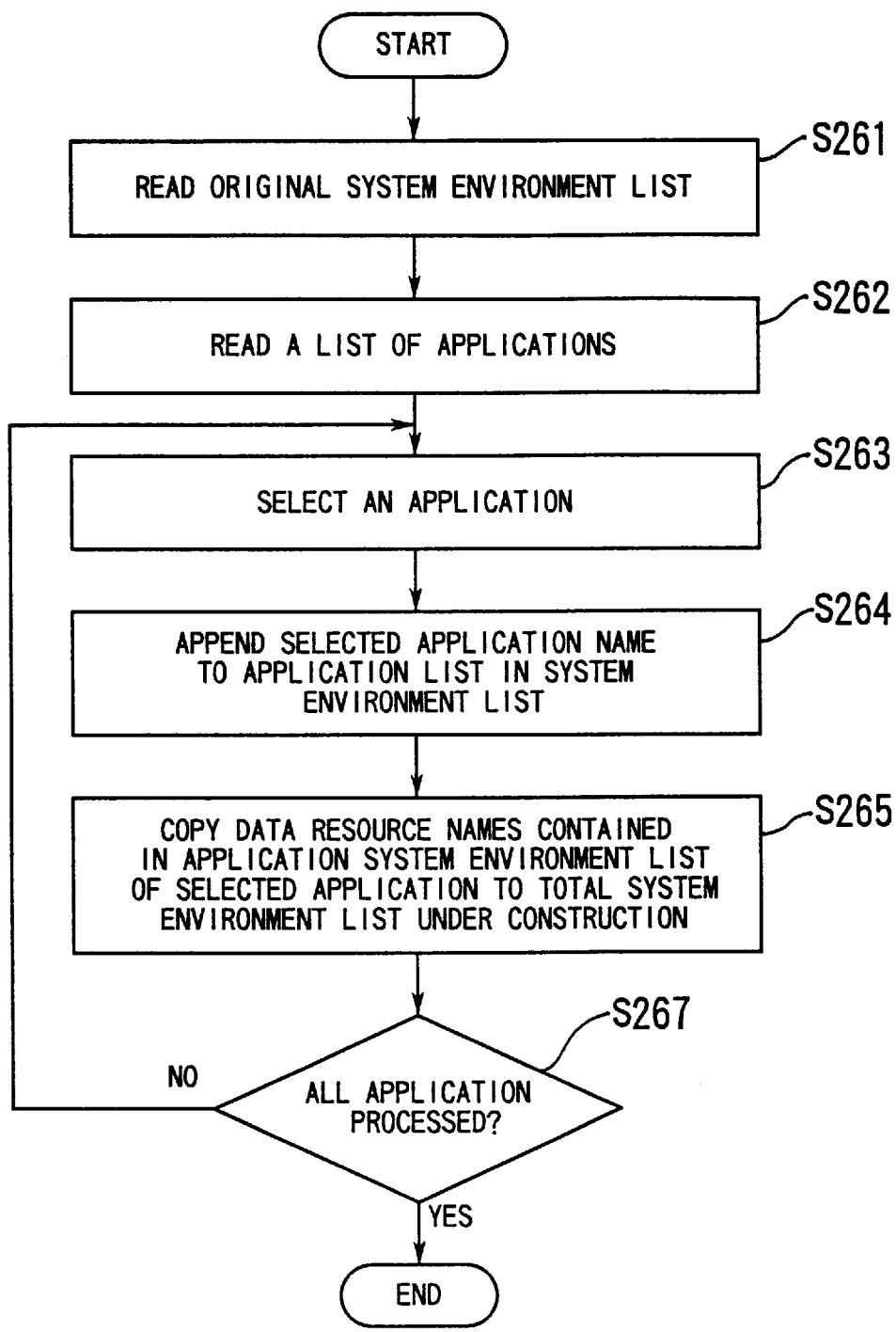
FIG. 15 is a flowchart showing a detailed process of combining system environment lists of respective applications.

FIG. 15 is a flowchart showing the detailed process of step S26 for integrating the system environment lists of respective applications into a total system environment list.

[S261] The system pattern combination means 9 reads the original system environment list as the basis of the total system environment list under construction.

[S262] The system pattern combination means 9 then reads out a list of applications from the application property table 3.

[S263] The system pattern combination means 9 selects one application from among those in the list of applications read in step S262.

[S264] The system pattern combination means 9 appends the name of the selected application to the application name list disposed in the system environment to which the application belongs.

[S265] The system pattern combination means 9 copies data resource names registered in the application system environment list for the selected application to a corresponding data name list in the total system environment list under construction. Since each data name list held by the total system environment list allows only one entry for the same data name, the second or further occurrences of the same name will not be copied to the same name list.

[S266] The system pattern combination means 9 examines whether it has finished all the applications or not. If all the applications are done, the process is terminated. Otherwise, the process returns to step S263 for selecting the next application.

In the way described above, the total system environment list encompassing all the system environment lists is completed. The applications and data resources will be allocated to their respective sites specified in the enterprise-wide or department-specific system environments in accordance with the total system environment list, thus allowing efficient development of an optimum distributed system solution.

The above discussion will be summarized as follows. According to the present invention, the system development workbench calculates application properties and data properties pertaining to the project specifications entered by the operator, and it retrieves system patterns suitable for the calculated properties from a system pattern database. A variety of system patterns, including those for distributed architecture, prepared in the system pattern database will enable an optimum distributed system to be easily configured.

Being capable of integrating a plurality of system patterns into a single system environment model to suit variously combined applications and data resources, the system development workbench of the present invention can provide optimum solutions for large-scale systems where many kinds of applications and data are allocated to mixed platforms and databases.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for supporting computer system development, comprising:

a system pattern database storing a plurality of system patterns;

project data entry means for entering information concerning applications and data resources to be integrated into the computer system;

application property analyzing means for analyzing the information entered through said project data entry means to obtain application properties for the respective applications;

data property analyzing means for analyzing the information entered through said project data entry means to obtain data properties for the respective data resources; and system pattern searching means for retrieving, from said system pattern database, at least one system pattern suitable for combinations of the application properties and the data properties.

2. An apparatus according to claim 1, further comprising system pattern combination means for, when said system pattern searching means retrieved a plurality of system patterns corresponding to a plurality of combinations of the applications and data resources, combining the plurality of system patterns retrieved.

3. An apparatus according to claim 1, wherein the plurality of system patterns stored in said system pattern database are arranged in correspondence to prescribed search parameters, and said system pattern searching means creates the search parameters from the application properties and the data properties and retrieves said at least one system pattern corresponding to the search parameters that are created.

4. An apparatus according to claim 1, wherein the application properties obtained by said application property analyzing means include a temporal property indicative of intervals of changes happening to the applications.

5. An apparatus according to claim 1, wherein the application properties obtained by said application property analyzing means include a spatial property indicative of how widely each of the applications is used.

6. An apparatus according to claim 1, wherein the data properties obtained by said data property analyzing means include a factor indicative of how widely each of the data resources is shared.

7. An apparatus according to claim 1, wherein the data properties obtained by said data property analyzing means include a factor indicative of how long each of the data resource remains valid.

* * * * *